(12) United States Patent
Fesshaie et al.

(10) Patent No.: US 11,570,852 B2
(45) Date of Patent: Jan. 31, 2023

(54) PPTC HEATING ELEMENT HAVING VARYING POWER DENSITY

(71) Applicant: Littelfuse, Inc., Chicago, IL (US)

(72) Inventors: Efrem Fesshaie, Norwich (GB); Paulius Kabisius, Kaunas (LT)

(73) Assignee: Littelfuse, Inc., Chicago, IL (US)

( * ) Notice: Subject to any disclaimer, the term of this patent is extended or adjusted under 35 U.S.C. 154(b) by 254 days.

(21) Appl. No.: 17/071,260

(22) Filed: Oct. 15, 2020

(65) Prior Publication Data
US 2022/0124876 A1  Apr. 21, 2022

(51) Int. Cl.
H01C 7/02 (2006.01)
H05B 3/14 (2006.01)
H02H 9/02 (2006.01)

(52) U.S. Cl.
CPC ............ H05B 3/146 (2013.01); H02H 9/026 (2013.01); H05B 2203/02 (2013.01)

(58) Field of Classification Search
CPC . H01C 7/02; H01C 7/027; H05B 3/14; H05B 3/03
See application file for complete search history.

(56) References Cited

U.S. PATENT DOCUMENTS

| 4,801,784 A * | 1/1989 | Jensen | H05B 3/146 |
| | | | 219/544 |
| 8,558,655 B1 * | 10/2013 | Chen | H01C 7/027 |
| | | | 338/13 |
| 10,902,980 B1 * | 1/2021 | Dong | H01C 1/1406 |
| 2002/0021203 A1 * | 2/2002 | Kojima | H01C 17/006 |
| | | | 338/68 |
| 2002/0058208 A1 | 5/2002 | Lin et al. | |
| 2002/0130757 A1 * | 9/2002 | Huang | H01C 1/148 |
| | | | 338/22 R |
| 2007/0166942 A1 * | 7/2007 | Cogan | H01L 29/0692 |
| | | | 257/E29.026 |
| 2014/0091896 A1 * | 4/2014 | Wang | H01C 7/021 |
| | | | 338/22 R |
| 2017/0125954 A1 * | 5/2017 | Tseng | H01R 13/6666 |
| 2021/0005362 A1 * | 1/2021 | Chen | H01C 7/13 |

FOREIGN PATENT DOCUMENTS

| CN | 108260232 A | 7/2018 |
| JP | 3060968 B2 | 7/2000 |
| TW | 201835946 A | 10/2018 |
| TW | I 687944 B | 3/2020 |

OTHER PUBLICATIONS

Extended European Search Report dated Mar. 14, 2022 for corresponding European Patent Appln No. 21202348.5.

* cited by examiner

Primary Examiner — Long T Tran
(74) Attorney, Agent, or Firm — KDB Firm PLLC (57) ABSTRACT

A pPTC heating device having areas with different power densities distributed over the surface of the device. The device is constructed using a base layer composed of a pPTC material having a layer of sectioned conductive plates disposed over and under the layer of pPTC such as to control the path of the current through the device, thereby controlling resistance of the device and the power density of the device.

19 Claims, 8 Drawing Sheets

PPTC HEATING ELEMENT HAVING VARYING POWER DENSITY

BACKGROUND OF THE INVENTION

A positive temperature coefficient (PTC) material is a material that exhibits a positive temperature coefficient, meaning that as its temperature increases its resistance increases proportionately. Typically, current can be passed through devices composed of a PTC material until the temperature of the material reaches a specific design temperature, at which point the resistance rapidly rises, effectively cutting off the flow of current.

A polymeric PTC (pPTC) is a PTC device composed of a non-conductive crystalline polymer infused with carbon particles. When below the design temperature, the polymer is in a crystalline state with the carbon particles forming conductive paths through the polymer. If too much current is passed, the device will heat and the polymer will change to an amorphous state, thereby separating the carbon particles and breaking the current paths. Once the device is cooled, the polymer will return to a crystalline state, thereby reestablishing the current paths created by the carbon particles.

pPTC is well-known for its use in resettable fuses, which will prevent current flow once the devices has reached its design temperature and which will then again allow current flow when the device is cooled to a temperature below the design temperature. Resettable fuses composed of pPTC are well known in the art.

Another common use for pPTC is as a heating device. These devices provide advantages over resistive heaters in which current is passed through a metal wire in that, because of the properties of pPTC, pPTC heaters cannot overheat and are self-limiting. Further, PTC heating elements have a high-power density and, as such, are very efficient at heat production, even within small spaces.

There are many applications for pPTC heaters. pPTC heaters may be used, for example, in tank heating applications, such as water or urea tanks, for comfort heating, for example, in car seats and steering wheel heaters, as lens defoggers and for battery heating, just to name a few. Typically, the device may comprise a flexible sheet of pPTC material having flexible conductive plates laminated on opposite sides of the pPTC material. In such applications, it may be desirable to be able to vary the power density over surface area of the device, allowing for example, different heating temperatures on different surface areas of the device.

Power density is dependent on voltage applied to the resistive element and heating element resistance, which will dictate the current passing through the device. Varying supply voltage in most cases requires additional components, thus increasing the cost of production.

It is also possible to achieve varying power density by using multiple sheets of pPTC material over the surface area of the heater, each having a different base material concentration, and, thus, different resistivities. Changing the formulation of the pPTC material to achieve different resistivities, however, is challenging and requires a very precise base material concentration and uniformity control, thereby increasing manufacturing costs.

Figure 1A:
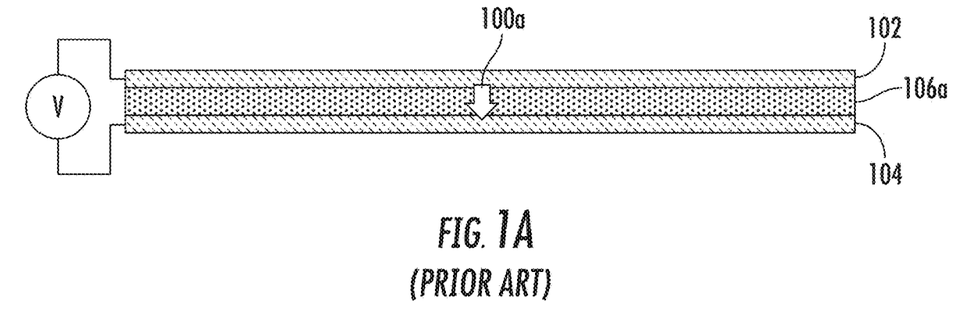
FIG. 1 shows schematic drawings of a high current prior art device and a low current prior art device, both having a constant power density over the entire surface of the device.
Figure 1B:
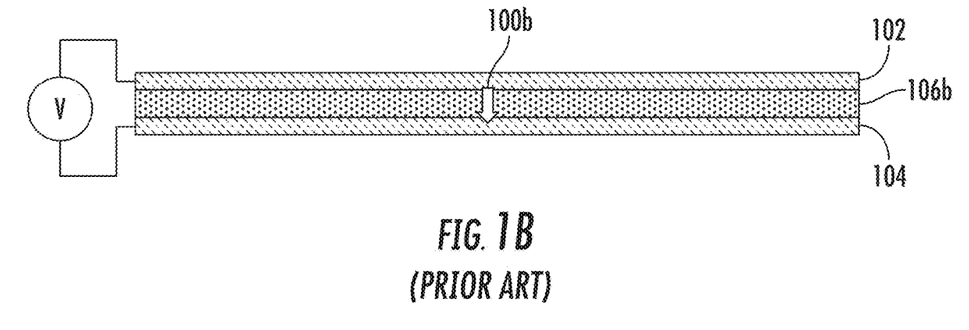

FIG. 1 shows examples of two prior art pPTC heaters. The devices consist of two electrically conductive plates, 102, 104 having a layer of pPTC material 106(*a,b*) disposed between the electrically conductive plates. FIG. 1(A) shows a device using a low resistivity pPTC material 106*a*, thereby allowing a high current flow 100*a* between electrically conductive plates 102 and 104. FIG. 1(B) shows another version of the device wherein the pPTC material 106*b* is a high resistivity material, which allows a smaller current 100*b* to pass between electrically conductive plates 102 and 104. As such, the power densities between the devices of FIG. 1(A) and FIG. 1(B) are different, but achieving the different power densities requires reformulation of the pPTC material 106 (*a,b*) between electrically conductive plates 102, 104 to change the resistivity.

SUMMARY OF THE INVENTION

To mitigate the challenges described above, a new method for controlling power density in pPTC heating devices is disclosed herein. The invention describes a device having different power densities over the surface area of the device. The method comprises using a single pPTC base material having a constant resistivity. Power density over the surface area of the device is controlled by splitting the upper and lower conductive layers into sectioned portions to control the current path through the device, and thus the overall resistivity of the device. By varying the size and number of the sectioned portions of the conductive layers over the surface area of the device, different areas of resistivity, and therefore different power densities, can be achieved in a single device.

The sectioned portions operate as resistors connected in series. Each sectioned portion will be smaller in size and, as there will be multiple sectioned portions connected in series, each sectioned portion would be exposed to a lower voltage. By changing the, sectioned portions and the way the sectioned portions overlap each other between the top layer and the bottom layer, power dissipation can be adjusted without changing the base material or the size of the heater.

An additional advantage of this sectioning strategy is that the heater can be split into multiple areas, with each area having a different number of sectioned portions, thereby resulting in different power densities per square unit of the surface area of the device. In areas where the sectioned portions are smaller, the resistance of those sections will be larger because the number of sectioned portions used will be greater, thus providing a lower power output per square unit of area, with the sectioned portions acting as resistors connected in series. On the other hand, in areas where the sectioned portions are larger, the count of the sectioned portions is lower. Therefore, the resistance will be lower in these areas and the power density per square unit of area will be higher. This enables flexible power density control over the entire surface of the heater, with different areas of the device having different power densities.

DETAILED DESCRIPTION

Figure 2A:
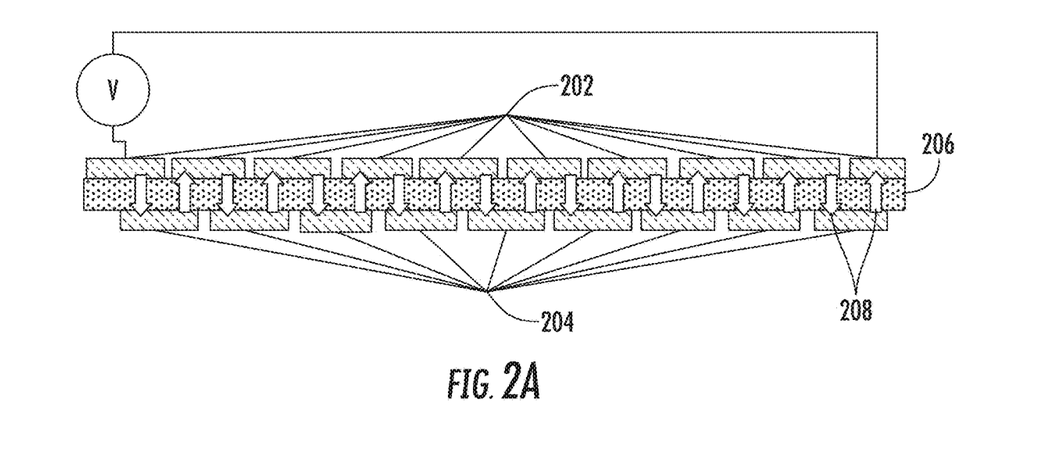
FIG. 2 shows two exemplary devices in accordance with the present invention, each device having a different power density based on the size of the sectioned portions in each electrically conductive layer.

FIG. 2 shows a schematic side views of two exemplary proof-of-concept embodiments of devices in accordance with the present invention. As shown in FIG. 2(A), the upper electrically conductive layer 202 and the lower electrically conductive layer 204 have been sectioned into several portions. In this embodiment, the portions are positioned such as to force the current to oscillate between the upper layer 202 and the lower layer 204 as the current traverses the device. The path of the current as it traverses the device from left to right is shown by the arrows, showing that the current oscillates between upper layer 202 and lower layer 204 through pPTC layer 206. The passage of the current though resistive layer 206 multiple times as the current traverses the device acts as a series of resistors, with a commensurate voltage drop with each transition through the pPTC layer 206.

In preferred embodiments of the invention, the sectioned portions of upper layer 202 and lower layer 204 are offset from each other such that the gaps between the portions of upper layer 202 and lower layer 204 are not aligned with each other. The size of the gaps between the sectioned portions in the layers 202, 204 force the current to take a shorter path through the layer of pPTC material 206 to a sectioned portion of the opposite layer. In preferred embodiments of the invention, the gaps between any two sectioned portions in layer 202 or 204 will be aligned with the midpoint of a sectioned portion in the opposite layer.

Additionally, for the device to operate as intended, it is necessary to make the gaps between the sectioned portions in each layer wide enough such as to force the current to pass through the pPTC layer 206 and into a sectioned portion of the opposite layer instead of jumping the gap between the sectioned portions of the same layer. In preferred embodiments of the invention, the gap between the section portions of each layer is at least two times the thickness of pPTC layer 206.

Figure 2B:
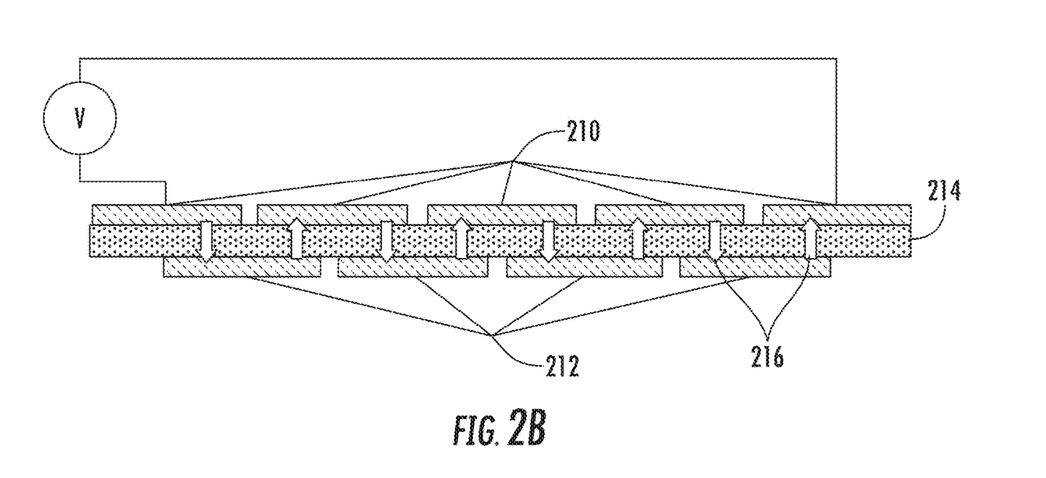

It should be noted that, in the device of FIG. 2(A), electrically conductive layers 202 and 204 have been sectioned into smaller portions than the electrically conductive layers 210 and 212 of the device of FIG. 2(B). Because the sectioned portions in layers 202, 210 and 204, 212 act as low resistance resistors connected in series, the device of FIG. 2(A) will have a higher resistance than the device of FIG. 2(B), thus allowing a smaller current to pass through the device of FIG. 2(A) than through the device of FIG. 2(B). As such, the pPTC layer 206, 214 of the devices in FIG. 2(A, B) could be of the same formulation and having the same resistivity, yet the power densities of the devices, and therefore the heat produced by each of the devices will be different.

Figure 3:
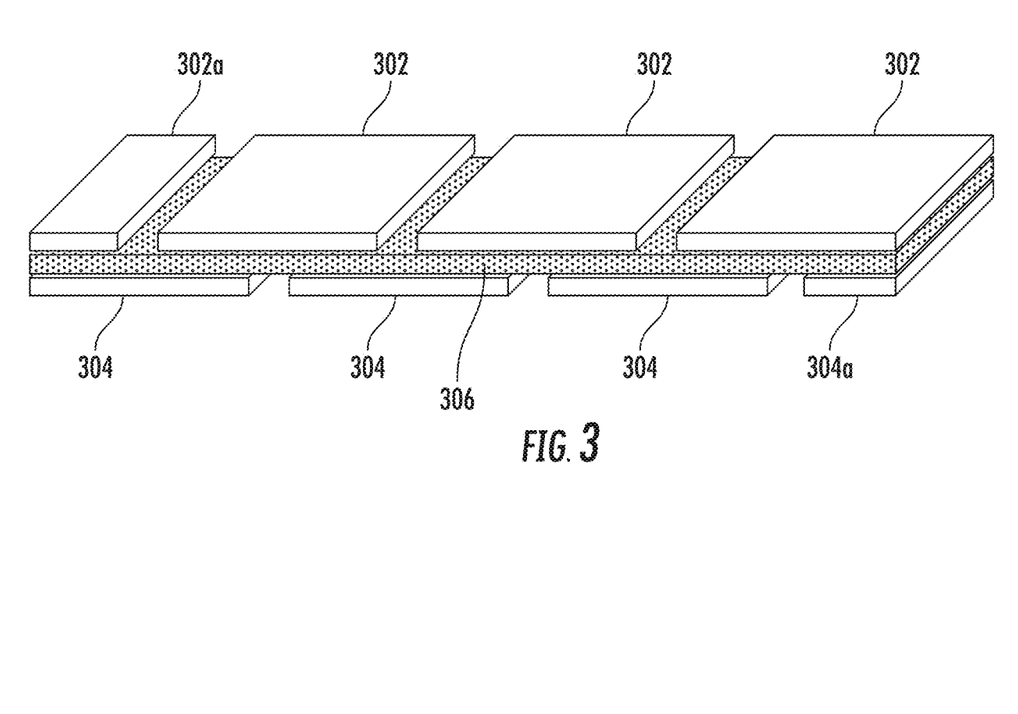
FIG. 3 is a perspective view of the device of FIG. 2 showing the positioning of the sectioned portions in the top and bottom layers with respect to each other.

FIG. 3 shows a perspective view of the device of FIG. 2(B), showing the relative placement of sectioned portions 302 in the upper layer and sectioned portions 304 in the lower layer as being offset with respect to each other. It should be noted that in this embodiment, the sectioned portions are offset in accordance with a preferred embodiment of the invention such that the gaps between the sectioned portions of each layer are aligned with the midpoint of a sectioned portion in the opposite layer. In other embodiments, it is not necessary that this alignment be exact for the device to operate as intended. The device may operate as intended as long as the gaps between the sectioned portions in one layer are not aligned with the gaps between the sectioned portions in the opposite layer. In addition, it should be noted that the device includes half-sized sectioned portions 302a and 304a on the ends of the device to avoid wasting the surface area of pPTC layer 306.

It should be noted that in, the devices of FIG. 2 and FIG. 3, the entire surface areas of the devices are comprised of sectioned portions having the same size (with the exception of the half portions 302a and 304a shown in FIG. 3). As such, the power density is different between the devices, but will remain constant over the entire surface area of a single device. In other embodiments of the invention, different areas of the surface of the device may have differently sized sectioned portions and different numbers of sectioned portions such as to produce areas of varying power density on a single device.

Figure 7:
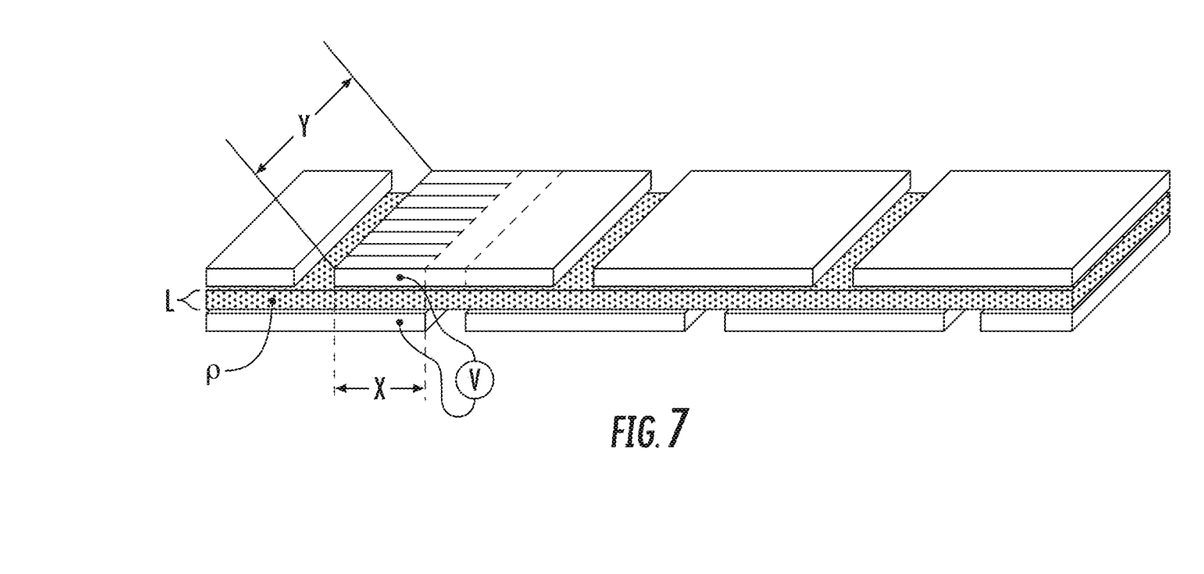
FIG. 7 illustrates how the power density of one section is dependent upon the voltage the resistivity of the PTC material and the thickness of the PTC material.

The power density of a single section can be calculated with reference to FIG. 7. The resistance, R, can be given by the equation:

$$R = \rho\left(\frac{l}{A}\right) \qquad (1)$$

where:
l is the thickness of the resistive PTC material in the current path;
ρ is the resistivity of the PTC material; and
A is the conductive area passing current.

Note that, in FIG. 7, the exemplary conductive area passing the current is a rectangular area having dimensions denotes in the figure as x, y. It should be noted that in various embodiments, the conductive area could be of any shape.

The power is given by:

$$P = vi^2 \qquad (2)$$

where:
v is the voltage across the conductive area; and
i is the current passing through the conductive are.
Because i=v/r. Eq (2) becomes:

$$P = \frac{v^2}{R} \qquad (3)$$

The power density is the power per area. As such:

$$P_d = \frac{\left(\frac{v^2}{R}\right)}{A} \qquad (4)$$

Substituting Eq. (1) for the resistance in Eq. (4) yields:

$$P_d = \frac{\left(\frac{v^2}{\rho\left(\frac{l}{A}\right)}\right)}{A} = \frac{\left(\frac{v^2 A}{\rho l}\right)}{A} = \frac{v^2}{\rho l} \quad (5)$$

It is clear from this equation that the power density, $P_d$, of one section of the device is a function of three variables: voltage, the specific resistivity of the PTC material and the thickness of the PTC material. As per the present invention, various device can have the same size, shape, and power rating (power dissipation at certain conditions) but one device may have constant power rating on all surfaces (i.e., constant power density) while another device may have higher power areas and smaller power areas (i.e., different power densities).

Figure 4A:
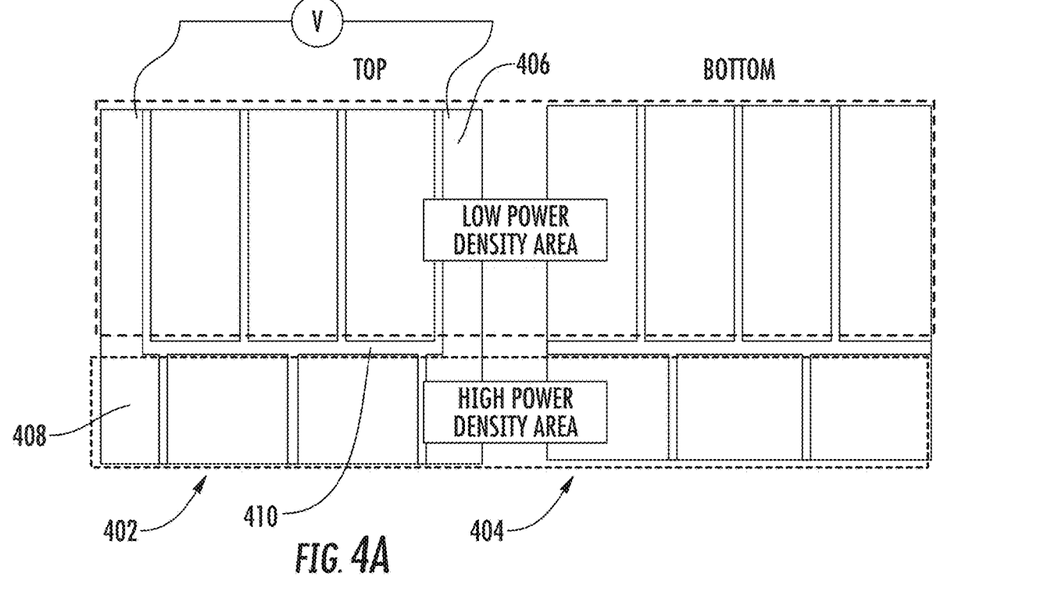
FIG. 4 shows an embodiment of a pPTC heater in accordance with the present invention having two different power density areas in a single device.

FIG. 4(A) shows an embodiment in which the device is provided with two separate areas having different power densities. FIG. 4(A) shows both the top electrically conductive layer 402 and bottom electrically conductive layer 404 of the device, both of which have been divided into areas having sectioned portions of different sizes to produce a low-power density area and a high-power density area, as indicated in the figure. It should be noted that when the top layer is disposed over the bottom layer with the pPTC layer in between, the gaps between the sectioned portions in the top layer will align with the midpoints of the sectioned portions on the bottom layer, and vice versa. It should further be noted that the voltage supply is connected between plates 408 and 406, which connects the low-power density area and the high-power density area in a parallel configuration.

The low-power density area and high-power density area of the device of FIG. 4(A) are electrically isolated from each other except for the common plates 406 and 408. As such, the gap between the low-power density area and the high-power density area must be large enough such that current will not jump between the areas. In preferred embodiments, the gap 410 between the low-power density area and the high-power density area will need to be larger than the gaps between the sectioned portions of each respective area.

Figure 4B:
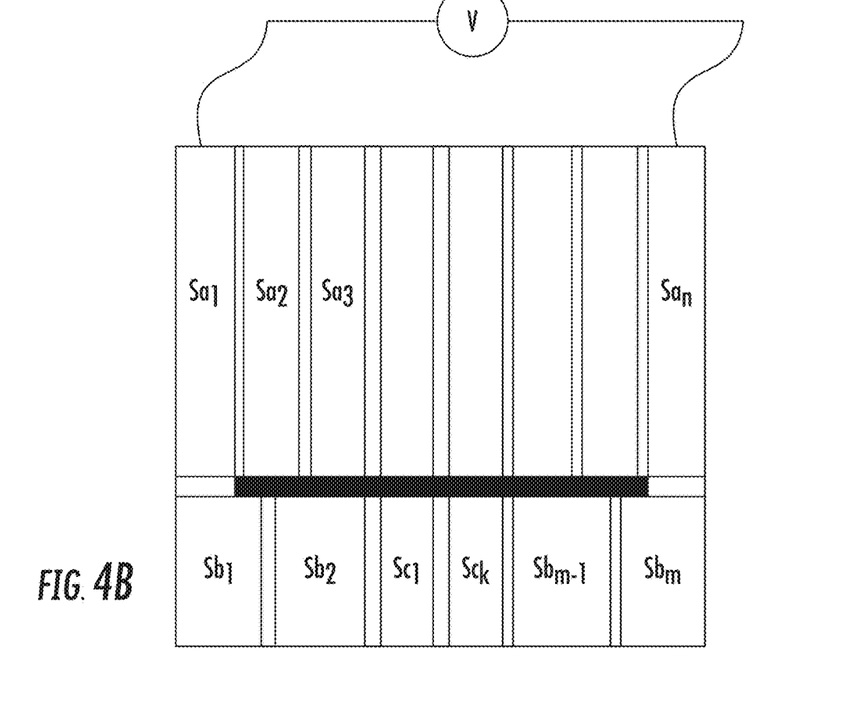

FIG. 4(B) shows a schematic version of the device of FIG. 4(A). Sectioned portions $Sa_1 \ldots Sa_n$ of the low-power density area Sa are connected in series to the power supply. Likewise, sectioned portions $Sb_1 \ldots Sb_n$ of high-power density area Sb are connected in a parallel configuration to the same power supply as sectioned portions $Sa_1 \ldots Sa_n$. All sectioned portions $Sa_1 \ldots Sa_n$ of area Sa are equal in size. As long as the sectioned portions of each area are equal in size, the power density will be equally spread. The same applies for the sectioned portions $Sb_1 \ldots Sb_n$ of area Sb. However, because sectioned portions $Sb_1 \ldots Sb_n$ are larger than sectioned portions $Sa_1 \ldots Sa_n$, sectioned portions $Sb_1 \ldots Sb_n$ will exhibit a lower resistance, resulting in a higher current. At the same time, the number of sectioned portions in area Sb is lower, which results in a higher voltage applied to each individual section. As a result, the current is higher and the power dissipation is larger in area Sb.

Figure 5A:
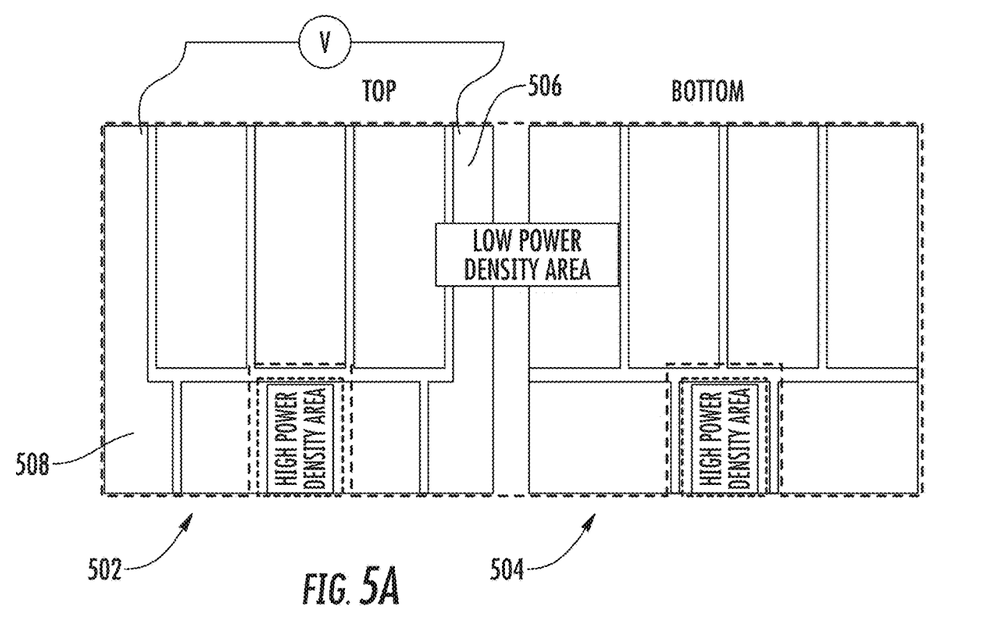
FIG. 5 shows a second embodiment of a pPTC heater in accordance with the present invention having two different power density areas in a single device, in which one area has sectioned portions of differing sizes.

FIG. 5(A) shows yet another variation of an embodiment in accordance with the present invention. The difference between the embodiment shown in FIG. 5(A) and the embodiment shown in FIG. 4(A) is that the high density area in FIG. 5(A) is smaller and surrounded by the low density area. The top and bottom layers of the device are shown as 502 and 504 respectively in FIG. 5(A). Also, as in the embodiment shown in FIG. 4(A), the voltage source is connected to sections 506 and 508 of the top layer 502.

Figure 5B:
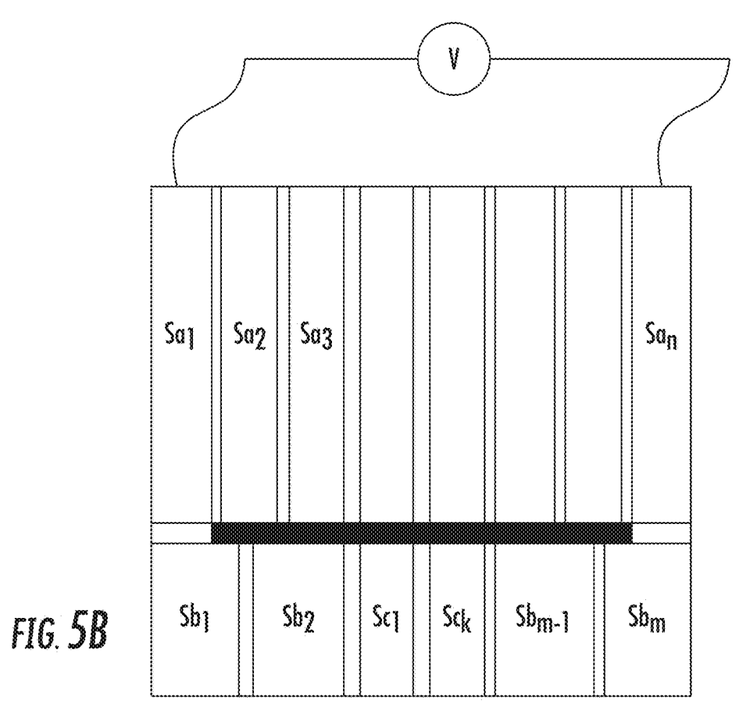

As shown in FIG. 5(B), sectioned portions $Sa_1 \ldots Sa_n$ of area Sa form the low-power density area and are connected in series with each other. Sectioned portions $Sb_1 \ldots Sb_n$ of area Sb form a second low-power density area. Sectioned portions $Sc_1 \ldots Sc_n$ of area Sc form the high-power density area and are smaller in size than the sectioned portions in areas Sa and Sb. In this embodiment, sectioned portions $Sb_1 \ldots Sb_n$ and sectioned portions $Sc_1 \ldots Sc_n$ are connected in series to the power supply. The difference between the embodiment of FIG. 5(A) and FIG. 4(A) is that the bottom part of the heater has larger sectioned portions (thus a lower resistance per section) which would result in higher current flowing in an increase in the power density. To mitigate this, area Sb is split and area Sc has been inserted in between the split sectioned portions of area Sb. Area Sc will have a higher resistance. The number of total transitions from sectioned portion $Sb_1$ to sectioned portion $Sc_1$ to sectioned portion $Sc_n$ to sectioned portion $Sb_n$ (all connected in series with the power supply and thus having the same current passing therethrough) is smaller than the total number of transitions in area Sa. To maintain the power density of area Sb, to be the same as area Sa, the current must be decreased. This decrease in current is achieved by replacing a few of the sectioned portions of area Sb with the sectioned portions comprising area Sc. Area Sc will have a higher resistance and will a develop higher voltage drop. The higher voltage drop from area Sc will reduce the voltage drop of area Sb, consequently reducing power density. By varying the sectioned portions in each area, an equilibrium where area Sa will have the same power density as area Sb can be achieved, while area Sc will have a higher power density.

Figure 6A:
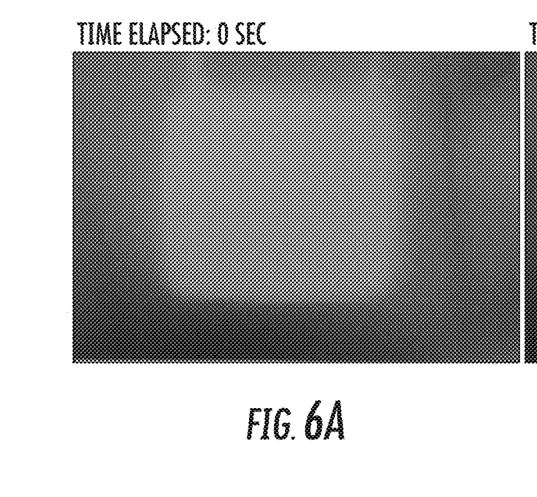
FIG. 6 shows an infrared image showing the heat provided in different areas of the surface of the devices of FIG. 4 in various stages before and after a voltage has been applied to the device.
Figure 6B:
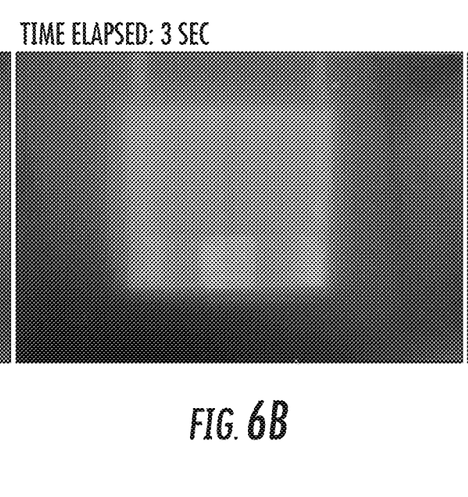
Figure 6C:
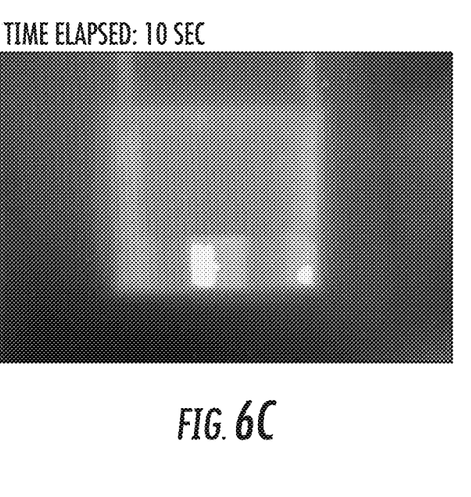

FIG. 6 shows infrared images of a resistive heater in accordance with the present invention having two different power density areas. The images shown are for the embodiment of the invention shown in FIG. 5. FIG. 6(A) shows an image of the device before voltage is applied. FIG. 6(B) shows an image of the device after power is applied, and FIG. 6(C) shows the device after the temperature has been stabilized. As can be seen, the bottom part of the heater, having a higher power density, is heating faster and reaches a higher temperature, with the highest temperature being present in the high-power density area Sc.

In preferred embodiments, the base resistive layer of the device is composed of pPTC. In one embodiment, the pPTC may be composed of polyethylene infused with carbon particles, however, any well-known formula for pPTC may be used. Also, in preferred embodiments, a single sheet of the PTC material having a constant resistivity will be used regardless of how many different power density sections are formed on the surface of the device. As may be realized, any number of different power density areas can be formed on the surface of the device by varying the size and number of the sectioned portions in each area of the conductive layers and by providing the required spacing of the sectioned portions and of the areas to force the current path to oscillate between the upper and lower layers in each area. The size of the overall device, as well as the actual number of different power density areas and the size of the sectioned portions for each power density area for any particular embodiment will be driven by the desired application. Also, in various embodiments, the electrically conductive layers may be any electrically conductive material, but in preferred embodiments will be copper or gold. In yet other embodiments, it may also be possible to section the pPTC material.

Figure 8:
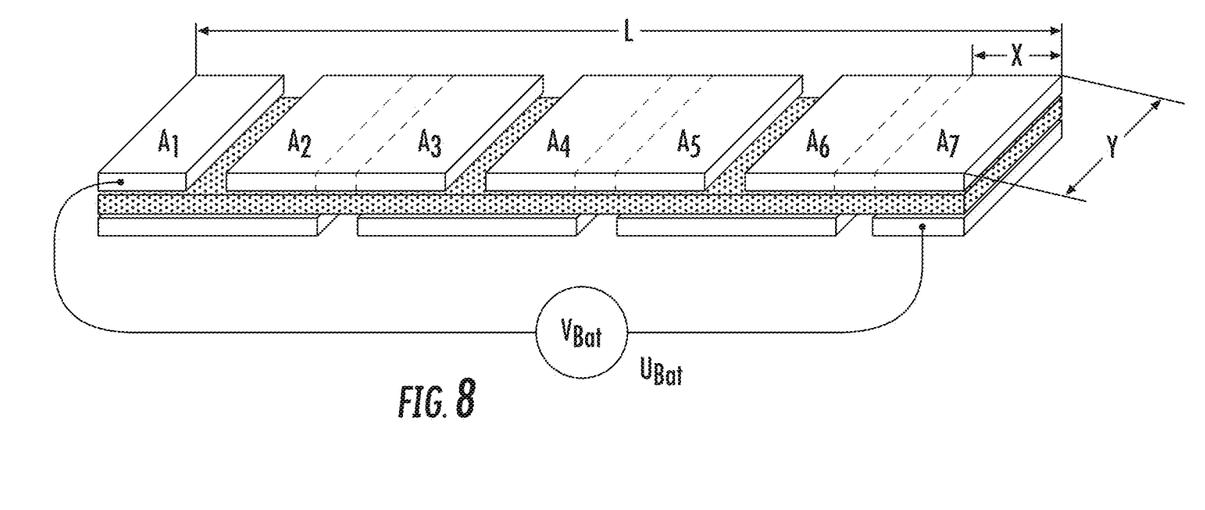
FIG. 8 illustrates that the power dissipated by the overall device can be varied by the number of sections.

In some embodiments of the invention, the sectioned portions may be of the same size, as shown in FIG. 8. As such, the resistance of each section is the same and is given by Eq. (1). Because all sections are connected in series, the total resistance of the device is given by the equation:

$$\Sigma R = R_1 + R_2 + R_3 + \ldots + R_{N-1} = R_N \qquad (6)$$

Where:
N is the total number of sectioned portions in the device. Eq. (3) then becomes:

$$P = \frac{v^2}{\Sigma R} \qquad (7)$$

To achieve areas of different power density on the same device, the number of sections can be varied from area to area. Substituting Eq. (1) for the resistance in Eq. 6, results in:

$$\sum R = N\rho\left(\frac{l}{A}\right) \qquad (8)$$

in the power dissipated becomes:

$$P = \frac{v^2}{N\rho\left(\frac{l}{A}\right)} \qquad (9)$$

The size of the sectioned portions can be expressed by the size of the device divided by the number of sections:

$$A = \frac{Ly}{N} \qquad (10)$$

where:
L is the overall length of the device shown in FIG. 8; and
y is the overall width of the device shown in FIG. 8.
Substituting Eq. (10) into Eq. (9) results in:

$$P = \frac{v^2}{N\rho\left(\frac{l}{\frac{Ly}{N}}\right)} = \frac{v^2 yL}{N^2 \rho l} \qquad (11)$$

From Eq. (11) is clear that the same device can have areas of different power density by changing the number of sectioned portions.

In other embodiments of the invention, another method to introduce higher power density is to provide smaller sectioned portions in series. As such, if the section portions are larger, the power density will be smaller. By Ohm's law, current is directly proportional to the voltage applied and inversely proportional to resistance. If one of the section portions is of a different size, then a difference in power dissipation can be demonstrated through current flow. As all sections are connected in series, current is equal in all sections, but resistance is dependent on the thickness of the resistive PTC material (l), the specific resistivity of the PTC material ($\rho$) and the area (A). As resistance is inversely proportional to area, a smaller area results in a higher resistivity.

The invention has been explained in terms of various embodiments, which are to be considered exemplary in nature and not limiting as to the scope of the invention, which is described in the claims which follow. Specifically, various embodiments of the devices of the present invention may include combinations of materials of different specific resistivities, devices of differing thickness, and removing portions of the conductive layer to render small portions of the heater ineffective.

We claim:

1. A device comprising:
   a layer of pPTC;
   a top layer of sectioned electrically conductive portions disposed on one side of the layer of pPTC and having gaps between the sectioned portions; and
   a bottom layer of sectioned electrically conductive portions disposed on an opposite side of the layer of pPTC and having gaps between the sectioned portions;
   wherein the sectioned electrically conductive portions are arranged such that the gaps between the sectioned portions in the top layer are non-aligned with the gaps between the sectioned portions in the bottom layer so as to form a current path traversing the device, the current path oscillating between the sectioned portions of the top layer and the sectioned portions of the bottom layer through the layer of pPTC.

2. The device of claim 1 wherein the sectioned portions of the top layer are spaced with respect to each other, wherein the sectioned portions of the bottom layer are spaced with respect to each other and wherein the spacing is at least twice the thickness of the layer of pPTC.

3. The device of claim 1 wherein the sectioned portions of the top and bottom layers are of constant size.

4. The device of claim 3 wherein the device has a constant power density over the surface area of the device.

5. The device of claim 1,
   wherein the sectioned portions are arranged such that the gaps between the sectioned portions in the top layer are aligned with a midpoint of the sectioned portions in the bottom layer and
   the gaps between the sectioned portions in the bottom layer are aligned with a midpoint of the sectioned portions in the top layer.

6. The device of claim 1 wherein the sectioned portions in the top and bottom layers act as a series of resistive devices.

7. The device of claim 1 wherein the device has multiple areas of sectioned portions in the top and bottom layers, each area of sectioned portions having sectioned portions of sizes different from the size of the sectioned portions in other areas.

8. The device of claim 7 wherein the multiple areas of sectioned portions in the top and bottom layers are separated from each other by a gap that prevents current from passing between the areas of sectioned portions.

9. The device of claim 7 wherein the sectioned portions in each area are all the same size.

10. The device of claim 7 wherein each of the multiple areas is electrically connected in parallel.

11. The device of claim 1 wherein the device has multiple areas of sectioned portions in the top and bottom layers, each area of sectioned portions having a different power density when a voltage is applied to the device.

12. The device of claim 11 wherein the device is a heater and further wherein each area of sectioned portions provides a different temperature when a voltage is applied to the device.

13. A heating element comprising:
a layer of pPTC;
a top layer of multiple areas of sectioned electrically conductive portions disposed on one side of the layer of pPTC; and
a bottom layer of multiple areas of sectioned electrically conductive portions disposed on an opposite side of the layer of pPTC;
wherein the sectioned portions of the top and bottom layers in each area are spaced such as to have gaps therebetween, the gaps in the top layer and bottom layer being non-aligned so as to form a current path traversing the heating element, the current path oscillating that oscillates between the sectioned portions in the top layer and the sectioned portions bottom layer for each area through the layer of pPTC.

14. The heating element of claim 13 wherein the multiple areas of sectioned portions in each layer are spaced such as to prevent current flowing from one area to another area.

15. The heating element of claim 13,
wherein the sectioned portions for each area spaced such that the gap between sectioned portions in the top layer of the area are aligned with a midpoint of the sectioned portions in the bottom layer of the area; and
wherein the sectioned portions for each area are spaced such that the gap between sectioned portions in the bottom layer of the area are aligned with a midpoint of the sectioned portions in the top layer of the area.

16. The heating element of claim 13 were each of the multiple areas are electrically connected in parallel.

17. The heating element of claim 13 wherein the layer of pPTC has constant resistivity for each area.

18. The heating element of claim 17 wherein each area of area of sectioned portions provides a different temperature when a voltage is applied to the device.

19. The heating element of claim 13 wherein each area of sectioned portions has a different power density when a voltage is applied to the device.

* * * * *